E. J. THOMPSON.
CARBURETER.
APPLICATION FILED FEB. 6, 1908.
904,659.
Patented Nov. 24, 1908.
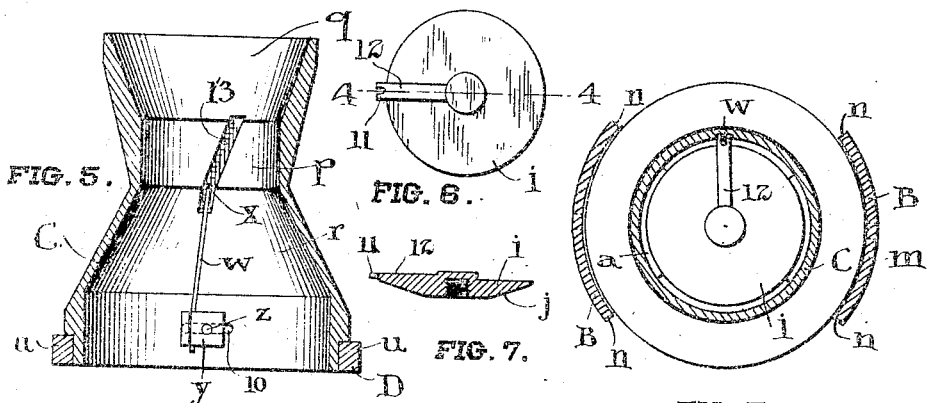
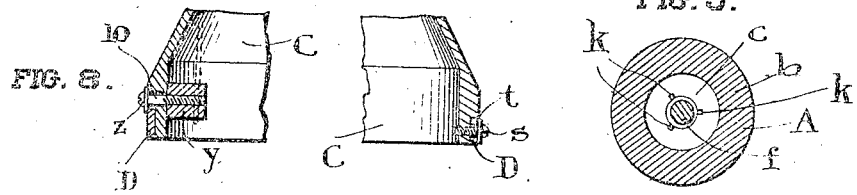
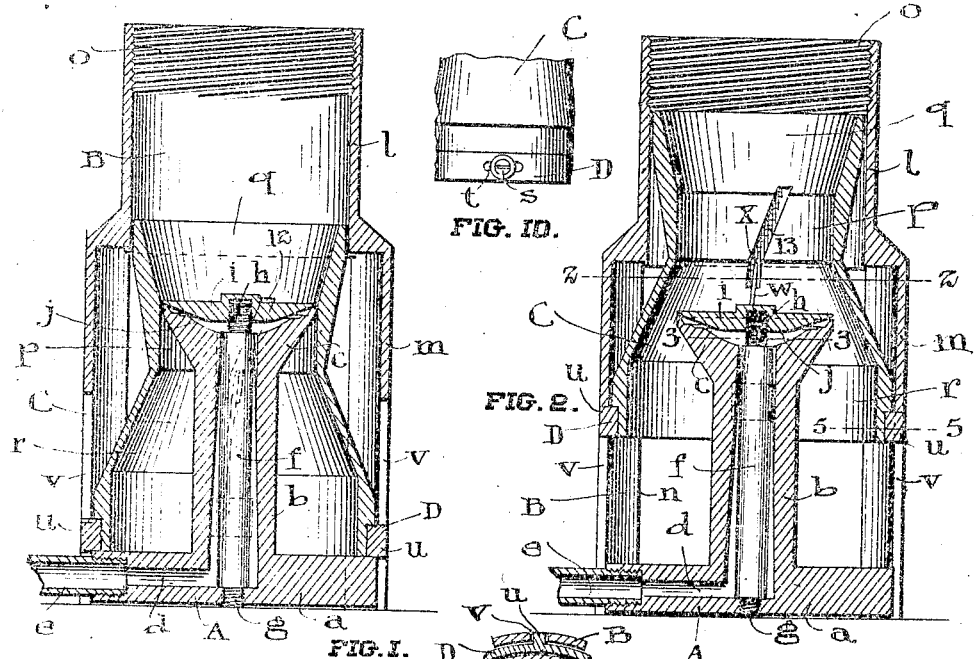
WITNESSES
INVENTOR
E. J. THOMPSON
BY
ATT'Y.

UNITED STATES PATENT OFFICE.

EDMUND JOHN THOMPSON, OF OTTAWA, ONTARIO, CANADA, ASSIGNOR, BY DIRECT AND MESNE ASSIGNMENTS, OF ONE-FOURTH TO BERTON HERBERT SILLS AND ONE-FOURTH TO RUSSEL SUTHERLAND SMART, OF OTTAWA, CANADA.

CARBURETER.

No. 904,659.       Specification of Letters Patent.       Patented Nov. 24, 1908.

Application filed February 6, 1908. Serial No. 414,663.

*To all whom it may concern:*

Be it known that I, EDMUND JOHN THOMPSON, of the city of Ottawa, in the county of Carleton, Province of Ontario, Canada, have invented certain new and useful Improvements in Carbureters, of which the following is a specification.

My invention relates to improvements in carbureters, and the objects of my invention are to provide a carbureter, which will automatically adjust itself to give a constant and proper proportion of combustible and air at all speeds of the engine, and which will have means also controlled by the suction of the engine for regulating the air supply to give the same velocity passing the spray nozzle, at all speeds, further objects being to improve the form of spray nozzle, whereby the combustible may be distributed in the most efficient manner, and may be sprayed into the air instead of being sucked out of the nozzle by the air.

In carrying out the invention in the embodiment illustrated, the spray nozzle consists of a vertically extending conduit having a concave basin formed on the top thereof, in combination with a convex valve piece screwed adjustably on a suitable screw and adapted to co-act with the basin to regulate the flow of combustible.

The spray nozzle is located within the air conduit and co-active therewith is a vertically movable air controlling member adapted to be raised and lowered by the suction of the engine. This is formed on the interior with a cylindrical portion, and gradually enlarged conical portion which, as the member is raised is adapted to gradually increase the passage-way through the air conduit. Means are provided on this member, whereby as it is raised and lowered, the valve piece of the spray nozzle will be opened and closed.

The invention is described in detail, in the accompanying specifications and drawings, in which, Figure 1 is a vertical section through the carbureter, in closed position. Fig. 2 is the same section with the air controlling member raised and the spray nozzle opened. Fig. 3 is a section along the line 2—2, Fig. 2. Fig. 4 is a section along the line 3—3, Fig. 2. Fig. 5 is a vertical section through the air controlling member. Fig. 6 is a top view through the valve piece on the spray nozzle. Fig. 7 is a section along the line 4—4, Fig. 6. Fig. 8 is a sectional detail through the side of the air controlling member. Fig. 9 is another sectional detail through another portion of the same. Fig. 10 is a front view of the sectional detail shown in Fig. 9. Fig. 11 is a sectional detail along the line 5—5 Fig. 2.

In the drawings, like letters of reference indicate corresponding parts in each figure.

Referring to the drawings, A represents the nozzle for the combustible, usually gasolene, consisting, in the embodiment illustrated, of a base portion $a$ secured to the outer casing B of the carbureter, a vertically extending stem $b$ formed at the top with a concave basin $c$ and provided in the stem and base portion with a conducting passage-way $d$, which is connected to the supply pipe $e$ for the combustible, leading to the supply tank located at a higher level than the carbureter, whereby the combustible will be sprayed through the nozzle under the action of gravity.

Centrally within the passage-way in the stem $b$ a cylindrical rod $f$ is provided, adapted to constrict the passage-way, and being held in position by a screw-threaded projection $g$ engaging the base and having at its top, a screw-threaded projection $h$, which is engaged by the valve piece $i$, which latter has a convex under-surface $j$ adapted to co-act with the basin $c$ to regulate the distribution of the combustible, from around the edge of the said basin.

Around the top of the rod $f$ a plurality of small auxiliary passage-ways $k$ are provided in the stem, symmetrically disposed around the rod and communicating with the passage-way $d$, whereby the combustible will be supplied evenly to different points around the basin.

The casing B in the embodiment illustrated, consists of an upper portion $l$, having an inner exactly cylindrical surface and a lower enlarged portion $m$, having apertures $n$ in the side thereof for the free admission of air. The interior of the top of the upper portion $l$ is preferably, provided with screw-threading $o$, whereby it might be directly attached to the intake pipe of the engine.

Vertically movable within the casing is the air controlling member C, which is provided with a central cylindrical portion $p$ of equal diameter with the basin on the spray nozzle and conical portions $q$ and $r$ on opposite sides thereof. The outer surface of the portion $q$ fitting closely to the cylindrical surface of the upper portion $l$ on the casing.

The member C is held in position by a ring D connected thereto by means of a screw $s$ extending through a slot $t$ in the ring, whereby a slight adjustment in position may be permitted between the member and the ring for the purpose hereinafter explained. The ring is provided with projections $u$ which engage vertically extending slots $v$ in the sides of the casing.

Means are provided on the air controlling member to turn the valve piece $i$ of the spray nozzle to correspond with the position of the air controlling member, whereby the supply of combustible may be always proportional to the supply of air.

In the embodiment illustrated, during the first part of the movement of the air controlling member, the valve piece is opened, through the medium of an inclined slot 13 formed in the cylindrical portion $p$ of the member C, and into which a projection 12, formed on the valve piece, extends. The projection 12 is provided with a bifurcated end 11 and as soon as it reaches the end of the slot, the bifurcated end is adapted to engage a wire $w$ which has its upper end bent inwardly and extended through the movable member, while its lower end is held in an adjustable block $y$ which is supported by a screw $z$ extending through a slot 10 in the member C. Thus the initial part of the movement of the valve piece is controlled by the slot, while the latter part is controlled by the inclined wire, and this wire, being adjustable at its lower end, enables the amount of opening of the valve for any given position of the movable member to be adjusted. As the slot ends with the cylindrical portion $p$, it will be seen that the amount of movement caused by the slot is completed before any appreciable amount of air flows past the supply nozzle, and the object of this is to have the fuel nozzle slightly open at the moment when the air begins to flow past the same, whereby the first charge will contain a maximum amount of combustible.

In operation the initial position of the parts of the carbureter, prior to the starting of the engine are shown in Fig. 1. Upon the engine being started, the suction thereof will gradually raise the air controlling member C and in doing this will turn the valve piece $i$ through the medium of the slot 13 and projection 12. By the time the end of the cylindrical portion $p$ on the member C is reached, the spray nozzle will be open a certain amount and upon the movement being continued further, the air will pass around the edges of the same and mix with the combustible discharged therefrom and pass into the engine, a desirable liberal supply of combustible being thus provided on the starting of the engine. Upon the engine increasing in speed, the suction will increase and raise the air controlling member C still further, and the conical surface $r$ of this gradually enlarging will cause the supply of air to increase, while, at the same time, the upward movement has turned the valve piece to open the spray nozzle still further. Thus, as the suction of the engine increases, the air supply is similarly increased, whereby the velocity of the air of the spray nozzle may remain constant and at the same time, the supply of combustible is increased, whereby the combustible mixture passing into the engine may always be of the same quality. It is evident that in the ordinary running of the engine a position of equilibrium will soon be reached in which the weight of the air controlling member C will just balance the suction of the engine. Should the engine be slowed down or speeded up for any purpose the supply of air and combustible will be increased or decreased to correspond, thus always insuring that the proper mixture is supplied to the engine in the quantities desired. The speed of the engine will, of course, be controlled by the throttle in the well known manner. The adjustment between the supply of air and the combustible for any particular engine may be accurately made by means of the block $y$ and the screw $s$, that is to say any particular engine on which the carbureter is used, is run first at a low speed and the screw $s$ is loosened and the member C turned until the combustible mixture is found to be of the proper quality. The screw $s$ is then tightened, and the engine run at high speed, raising the member C. The screw $z$ is then unloosened and the block $y$ adjusted, until the mixture is found to be of the proper quality at this speed. It will thus be found that the mixture between the intermediate speeds will be of the proper quality as the inclined wire $w$ will open the valve piece $i$ a proper amount for each of the intermediate speeds.

It might be pointed out that the spray nozzle possesses novel features itself apart from its particular use in combination with the air controlling member. These are in the method of distributing the combustible from the periphery of the basin controlled by the convex valve piece. The combustible is forced through the nozzle from the supply tank by gravity and is sprayed into the passing air instead of being sucked out thereby. It might also be pointed out that the air controlling member C possesses distinct and novel advantages itself apart from the combination, namely that, as the suction of the engine increases it automatically increases the area of the passage-way in the air conduit, whereby the velocity of the air at the spray nozzle may always remain constant, although the amount supplied increases.

The basin of the spray nozzle, in addition to performing the function of distributing the combustible, serves as a baffle plate for the air to enable the regulation to be made by the conical controlling member. In fact the basin and air controlling member really form a gravity-seated valve for the air conduit.

While, therefore, the different parts of the carbureter have been shown in a particular combination herein, and while the combination only possesses a maximum efficiency when operated together, yet, the different features and elements thereof possess novelty as hereinafter claimed.

What I claim as my invention is:—

1. In a carbureter, and in combination a spray nozzle, a rotatable member controlling the passage of combustible therethrough, a movable air-controlling member actuated automatically by the suction of the engine and means operated by the movement of the air-controlling member for rotating the said controlling member.

2. In a carbureter, and in combination, a spray nozzle, a rotatably-mounted valve piece therefor, a movable member actuated automatically by the suction of the engine and controlling the passage of air through the carbureter, and means on said movable member, for turning the valve to open and closed position.

3. In a carbureter, and in combination, a radially-distributing spray nozzle, a valve-piece controlling the passage of liquid through the same, and rotatably about an axis substantially normal to the plane in which the spray is distributed, a movable member actuated automatically by the suction of the engine and controlling the air passing through the carbureter and means operated by the movement thereof for opening and closing the valve piece.

4. In a carbureter, and in combination, a spray nozzle, a rotatable member controlling the passage of combustible therethrough, a movable, air-controlling member and an inclined member thereon connected to the rotatable controlling member, adapted, on movement of the movable member, to move the rotatable member to open and closed position.

5. In a carbureter, and in combination, a spray nozzle, a rotatable member controlling the passage of combustible therethrough, a movable, air-controlling member and an inclined member thereon connected to the rotatable controlling member, adapted, on movement of the movable member, to move the rotatable member to open and closed position, and means for adjusting the inclination of said inclined member.

6. In a carbureter and in combination, a movable, air-controlling member adapted to be reciprocated in a straight line, a spray nozzle within the same, a rotary valve piece for the spray nozzle having a projection thereon with a bifurcated end, and an inclined wire carried by the air-controlling member engaging the bifurcated end of said projection.

7. In a carbureter and in combination, a longitudinally movable, air-controlling member, a ring adjustably connected to the same having projections therein, a casing having longitudinal slots therein, into which the projections are adapted to extend and adapted to prevent rotary movement of the air-controlling member, a spray nozzle within the movable member, a rotary valve piece therefor and inclined means on the movable member engaging the valve piece.

8. A carbureter including a casing, a spray nozzle within the same having an enlarged top portion, a valve piece for the spray nozzle, a longitudinally movable, tubular, air-controlling member extending about the spray nozzle formed with the inner cylindrical portion of substantially equal diameter with the top of the spray nozzle, into which the said top is adapted to extend when the air-controlling member is in closed position, a lower conical portion, and means carried by the air-controlling member for actuating the valve piece of the spray nozzle.

9. A carbureter including a casing, a spray nozzle in the same having an enlarged top portion, a rotary valve piece for the spray nozzle having a projection thereon, a slidable, air-controlling member extending about the spray nozzle and formed with a cylindrical portion of equal diameter with the top of the spray nozzle, into which the said top is adapted to extend when the member is in closed position, the said cylindrical portion having an inclined groove formed in the sides thereof into which the projection on the valve piece is adapted to extend, the said air-controlling member having a gradually enlarged, lower portion and inclined means on said lower portion for engaging the projection when it passes out of the groove.

In witness whereof I have hereunto set my hand in the presence of two witnesses.

EDMUND JOHN THOMPSON.

Witnesses:
RUSSEL S. SMART,
MARY C. LYON.